United States Patent [19]

Freeman

[11] Patent Number: 4,583,607

[45] Date of Patent: Apr. 22, 1986

[54] LOAD CELL ASSEMBLY WITH ADJUSTABLE STIFFNESS

[75] Inventor: Gerald C. Freeman, Darien, Conn.

[73] Assignee: Pitney Bowes Inc., Stamford, Conn.

[21] Appl. No.: 618,275

[22] Filed: Jun. 7, 1984

[51] Int. Cl.[4] .......................... G01G 21/28; G01G 3/08
[52] U.S. Cl. ...................................... 177/244; 177/229
[58] Field of Search ......................... 177/187, 229, 244

[56] References Cited

U.S. PATENT DOCUMENTS

| | | | |
|---|---|---|---|
| 4,143,727 | 3/1979 | Jacobson | 177/229 X |
| 4,344,496 | 8/1982 | Langlais et al. | 177/229 X |
| 4,448,085 | 5/1984 | Lee | 177/229 X |
| 4,485,881 | 12/1984 | Tramposch et al. | 177/229 X |

Primary Examiner—George H. Miller, Jr.
Attorney, Agent, or Firm—Robert H. Whisker; David E. Pitchenik; William D. Soltow, Jr.

[57] ABSTRACT

A load cell assembly having a predetermined overall stiffness and a mounting plate for reducing the apparent stiffness of the load cell assembly to that predetermined level are disclosed. A load cell is mounted on a base by a mounting plate so that the load cell is fixed with respect to mechanical ground yet is free to deflect under load. The overall stiffness of the assembly is reduced to a predetermined stiffness by selecting the resiliency of the mounting plate in accordance with the stiffness of the load cell. The resilience of the load cell may be determined by either undercutting the mounting plate or by proper selection of materials. An apparatus for protecting the scale from overloads and shock loads is also disclosed.

6 Claims, 3 Drawing Figures

LOAD CELL ASSEMBLY WITH ADJUSTABLE STIFFNESS

BACKGROUND OF THE INVENTION

This invention relates to the protection of load cells from overloads and shock loads, and more particularly to a novel apparatus which allows substitution of load cells having substantially different stiffness without the need to redesign the over load protection for the load cell used.

The use of load cells in scales has become quite common. Load cells offer many advantages in comparison to spring and balance scales; particularly, they provide an electrical output which is readily adaptable to the electronics of computing scales (i.e., scales having an output which is a function of the measured weight and other variables) such as postal scales. However, load cells have a significant disadvantage in that they are easily damaged by overloads and shock loads. Thus, it is necessary to provide overload and shock load protection for load cells in the form of downstops, which limit the deflection of the load cell under load. Upstops are also frequently provided to limit upwards deflection and protect against lifting loads, as when a scale is lifted by the pan. Typically load cells are also protected against torsion loads (e.g., from twisting forces generated by objects placed off center on the scale pan) by downstops positioned under the corners of the scale pan. Methods of torsion load protection are well understood by those skilled in the art and may be used with the apparatus of the subject invention, but need not be discussed further here for an understanding of the subject invention.

Since load cells, even of the same model, will tend to vary slightly in stiffness it has, in general, been necessary to provide means for adjusting the overload protection stops provided in a scale. (for purposes of this discussion "stiffness" may be considered as the load per unit deflection). Further, since full scale deflection, even for the least stiff load cells, is on the order of thousandths of an inch such adjustments were delicate and particularly difficult to do in the field. Typically the downstop would be adjusted by adjusting a bolt threaded into the base beneath the load cell. The bolt would then be secured with a lock nut to act as a downstop. This approach, however, has several problems. One problem is that securing the lock nut often disturbed the adjustment. Another problem is that in many designs the adjustment could only be made with access to both sides of the scale base. Another is that the difference in stiffness of load cells is so great that installation of a new load cell without first backing-off the downstop from its previous adjustment would often result in an upward deflection great enough to damage the new load cell. Also, such downstops provided no protection against lifting forces so that separate upstops, requiring a separate adjustment, where needed to provide protection against lifting forces.

Another problem with previous means of protecting load cells from overload and shock load is that if a scale manufacturer wanted to substitute a different model of load cell into his scale the change in full scale deflection might be so great, possibly by a factor of four or more, that the stop adjustment might lack sufficient range to accommodate the new load cell. Further, if a relatively stiff load cell, with a small full scale deflection, were substituted the required adjustment of the stops would become still more delicate and difficult to do.

Thus, it is an object of the subject invention to provide an apparatus for protecting a load cell from overload and shock load which may be simply adjusted.

It is another object of the subject invention to provide such an apparatus which is adaptable to function with load cells having different degrees of stiffness.

It is still another object of the subject invention to provide a means whereby the apparent stiffness of a load cell may be adjusted to a predetermined level without affecting its measurement characteristics.

BRIEF SUMMARY OF THE INVENTION

The above objects are achieved and the disadvantages of the prior art are overcome by means of an apparatus which fixes the load cell to a base by means of a mounting plate whose resilience is choosen in accordance with the stiffness of the load cell to provide a predetermined overall stiffness so that by proper selection of the mounting plate load cells having differenct degrees of stiffness may be used with the overload protection apparatus of the subject invention without the need to modify the overload protection apparatus.

In a preferred embodiment of the subject invention the resilience of the mounting plate is increased by undercutting the mounting plate.

Thus the subject invention advantageously provide a simple economical and easily manufactured apparatus which achieves the above objects. Other objects and advantages of the subject invention will be apparent to those skilled in the art from consideration of the detailed description of embodiments of the subject invention set forth below and of the attached drawings.

DETAILED DESCRIPTION OF EMBODIMENTS OF THE INVENTION

Figure 1:
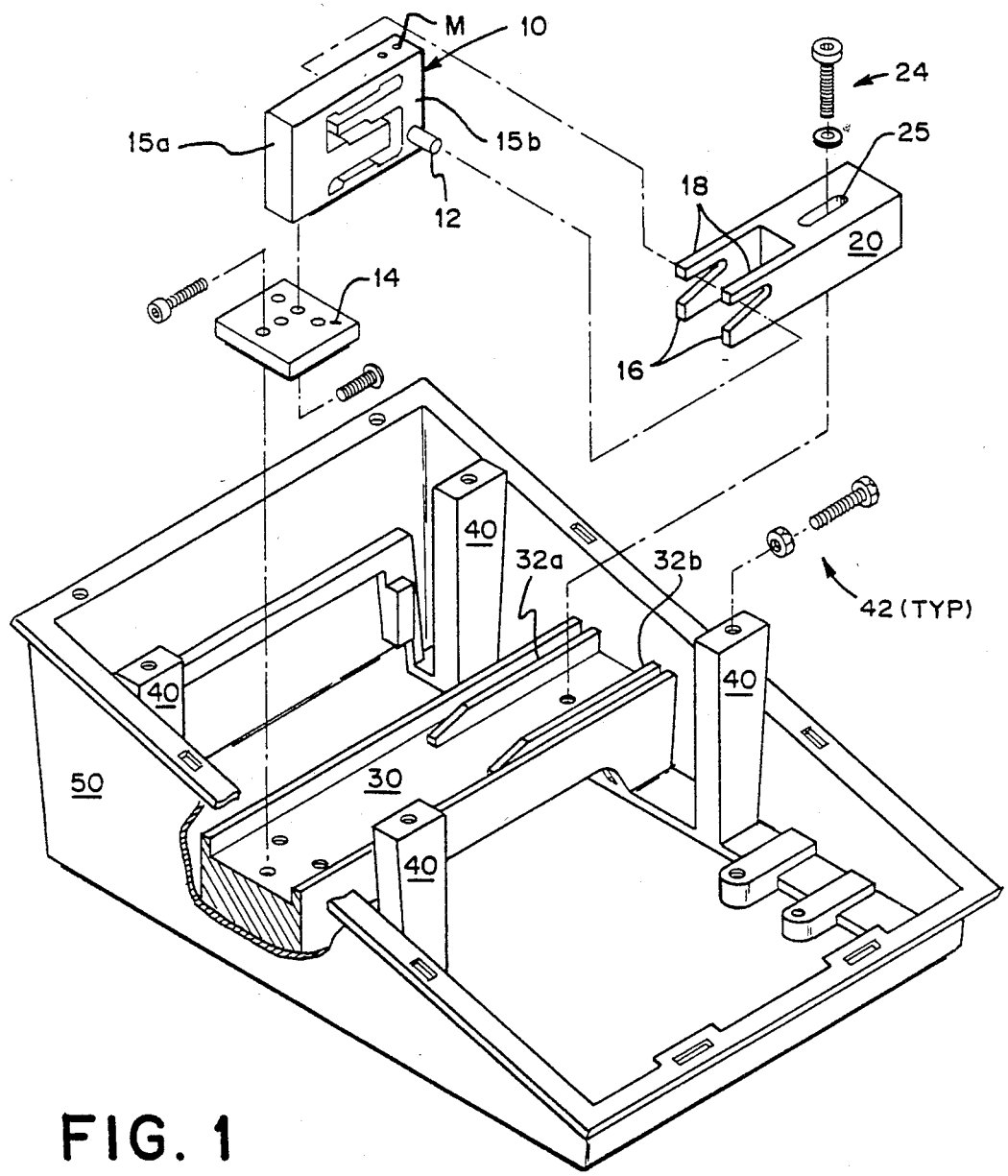
FIG. 1 shows an exploded isometric of a load cell mounted to a scale base in conjunction with the apparatus of the subject invention.

FIG. 1 shows an exploded view of load cell 10 mounted in scale base 50 in accordance with the subject invention. Scale base 50 is preferably a unitary molded plastic shell which includes four downstop structures 40 positioned under the corners of the scale pan (not shown) to provide protection against torsion loads and bridge structure 30 which establishes a mechanical ground for load cell 10 and upon which load cell 10 is mounted. Downstops 40 may be adjusted in a conventional manner by means of bolt and lock nut assemblies 42. However, since deflections on the periphery of the pan (not shown) are relatively great in comparision to deflection at the center, for similar loads, the adjustment of downstops 40 is less critical than the adjustment of central downstops.

Load cell 10 is a conventional parallelogram load cell which comprises two parallel rigid legs 15a and 15b. Load cell 10 is mounted to base 30 by mounting plate 14 which is positioned between and fixed to base 30 and rigid leg 15a so as to firmly connect load cell 10 to the mechanical ground established by bridge structure 30 while leaving rigid leg 15b free to deflect under load. The load is applied to load cell 10 from the scale pan (not shown) by means of a conventional single point mounting fixed to rigid leg 15b at point M. Such single point mounting load cells are considered particularly advantageous because of the relatively low sensitivity of their response to torsion loads.

In general the mounting and operation of parallelogram load cells is well understood in the art and need not be discussed here for an understanding of the subject invention. In particular, the electronic apparatus used to detect and process the output signal produced by load cell 10 is not relevant to an understanding of the subject invention and is not shown and will not be discussed here.

FIG. 1 shows, in accordance with the subject invention, two opposed projecting elements 12 (only one shown) are fixed to leg 15b of load cell 10 and project from load cell 10 in opposite directions normal to the deflection of load cell 10. Preferably projections 12 are provided by a cylindrical medal rod which is passed through a hole drilled in leg 15b. Movable element 20 is also provided in accordance with the subject invention and rests on bridge structure 30 between guide rails 32a and b so that it is free to move back and forth in a direction normal to projecting elements 12. Movable element 20 includes lower inclined projections 16 and upper inclined projections 18, the inner surfaces of projections 16 and 18 both sloping downwardly away from the body of element 20, and a means for securing element 20 with respect to load cell 10 which includes bolt and washer assembly 24 passing through slot 25 and threaded into bridge structure 30.

As will be described more fully below element 20 may be used to provide upstop and downstop protection for load cell 10 by applying a predetermined load, typically approximately 120 per cent of full scale load, to load cell 10 and sliding movable element 20 forward so that lower inclined projections 16 pass beneath projecting elements 12 and continuing to slide element 20 forward until inclined projections 16 just touch projecting elements 12 and securing movable element 20 by tightening assembly 24. When the load is removed from load cell 10 a downstop clearance will automatically be established between projecting elements 12 and lower inclined projections 16. Simultaneously an upstop gap is established between elements 12 and upper inclined projections 18.

Figure 2:
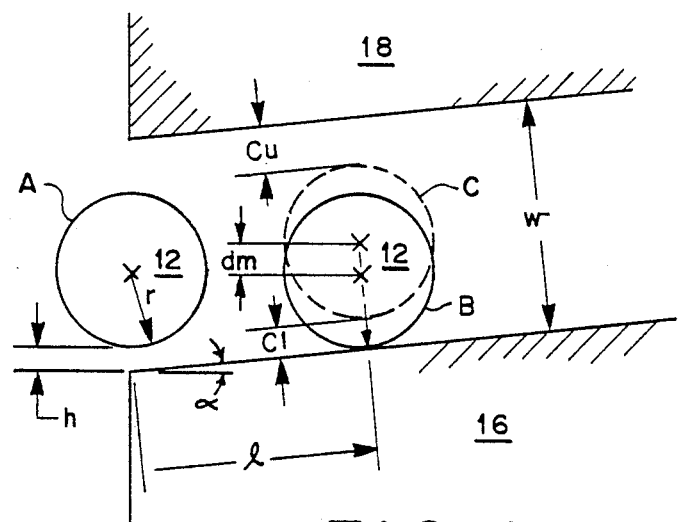
FIG. 2 is a semi-schematic of the adjustment of the downstop and upstop of the subject invention.

In FIG. 2 the geometry of the relationship between elements 12 and inclined projections 16 and 18 is shown in more detail. When the predetermined load is applied to load cell 10 a nominal vertical clearance h, which will vary somewhat for particular load cells, is established between element 12 and the leading edge of lower inclined projection 16. Projection 16 slopes upwards at an angle (alpha) to the horizontal. Thus, as element 20 is moved to the left element 12 will first touch lower projection 16 a distance 1 from the leading edge. The nominal value for 1 is given by:

$$1 = \frac{h \cos(\alpha) - r(1 - \cos(\alpha))}{\cos(\alpha) \sin(\alpha)}$$

where r is the radius of element 12.

When the load is removed from the load cell element 12 will return with the load cell to its no load position, as shown at C in FIG. 2. This will establish a maximum deflection $d_m$ and a lower clearance $c_l$ between element 12 and lower inclined projection 16. By proper choice of the width, w, between the surfaces of projections 16 and 18 with proper allowance for the tolerance on r and the variations in $d_m$ the upper clearance $c_u$ is simultaneously established. Preferably, the opposed faces of projections 16 and 18 should be substantially parallel at least in the region around 1 for consistency in upper clearance $c_u$.

Figure 3:
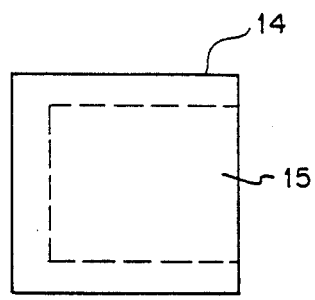
FIG. 3 shows top and side views of a load cell mounting plate modified in accordance with one embodiment of the subject invention.
Figure 3:
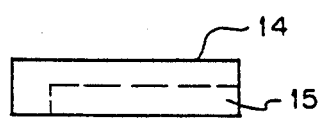

In one embodiment of the subject invention as shown in FIG. 1 it is desirable for load cell 10 to have a relatively low stiffness and a full scale deflection of approximately from 8 to 9 thousandths of an inch. In another embodiment load cell 10 might comprise a different load cell of greater stiffness with a full scale deflection of only 2 to 3 thousandths of an inch. To avoid the need to redesign movable element 20 when a stiffer load cell is used and also to avoid increasing the delicacy of the adjustment, the subject invention provides for adjusting the overall stiffness of the assembly formed by load cell 10 and mounting plate 14 to maintain a constant overall stiffness by adjusting the resiliency of mounting plate 14. In FIG. 3 mounting plate 14 is shown as adapted in accordance with the subject invention for use with a relatively stiff load cell. Mounting plate 14 is provided with an undercut 15 which increases its resiliency so that the overall stiffness of the assembly formed by load cell 10 and plate 14 is decreased to the desired level. The extent of undercutting needed may be approximated by a person skilled in the art of mechanical engineering from a knowledge of the desired overall stiffness, the stiffness of the load cell being used, and Youngs's modulus of the material from which mounting plate 14 is made, by well known conventional techniques. The approximation may then be quickly further refined by a few simple experimental trials. Alternatively the extent of undercut needed may be determined using conventional finite element techniques. It is also within the contemplation of the subject invention to vary the resilience of mounting plate 14 by proper choice of the materials for mounting plate 14.

The above description of embodiments of the invention and the attached drawings have been provided by way of illustration only, and numerous other embodiments of the subject invention will be apparent to those skilled in the art. Thus, limitations on the scope of the subject invention are to be found only in the claims set forth below.

What is claimed is:

1. A load cell assembly having a predetermined overall stiffness, comprising:
   (a) a parallelogram load cell having two rigid parallel legs connected by two parallel flexure members and having a particular stiffness greater than said predetermined overall stiffness;
   (b) a base;
   (c) a mounting plate positioned between and fixed to said base and to one of said parallel legs so that the other of said legs is suspended above said base and is free to deflect under load, the resilience of said mounting plate being chosen in accordance with said particular stiffness so as to reduce the overall stiffness of said assembly to said predetermined stiffness.

2. The load cell assembly described in claim 1 wherein the chosen resilience of said mounting plate is at least partially achieved by undercutting said mounting plate.

3. The load cell assembly described in claim 1 wherein the chosen resilience of said mounting plate is at least partially achieved by the selection of material for said mounting.

4. A mounting plate for mounting a load cell to a base, said mounting plate having a resilience chosen in accordance with the stiffness of said load cell so as to reduce the apparent stiffness of said load cell to a predetermined level.

5. The mounting place described in claim 4 wherein the chosen resilience is at least partially achieved by undercutting said mounting plate.

6. The mounting plate described in claim 4 wherein the chosen resilience is at least partially achieved by the selection of material for said mounting plate.

* * * * *